Nov. 2, 1937. C. H. SHOOK 2,097,779
MEANS FOR PURIFYING POLLUTED LIQUIDS
Filed April 29, 1935
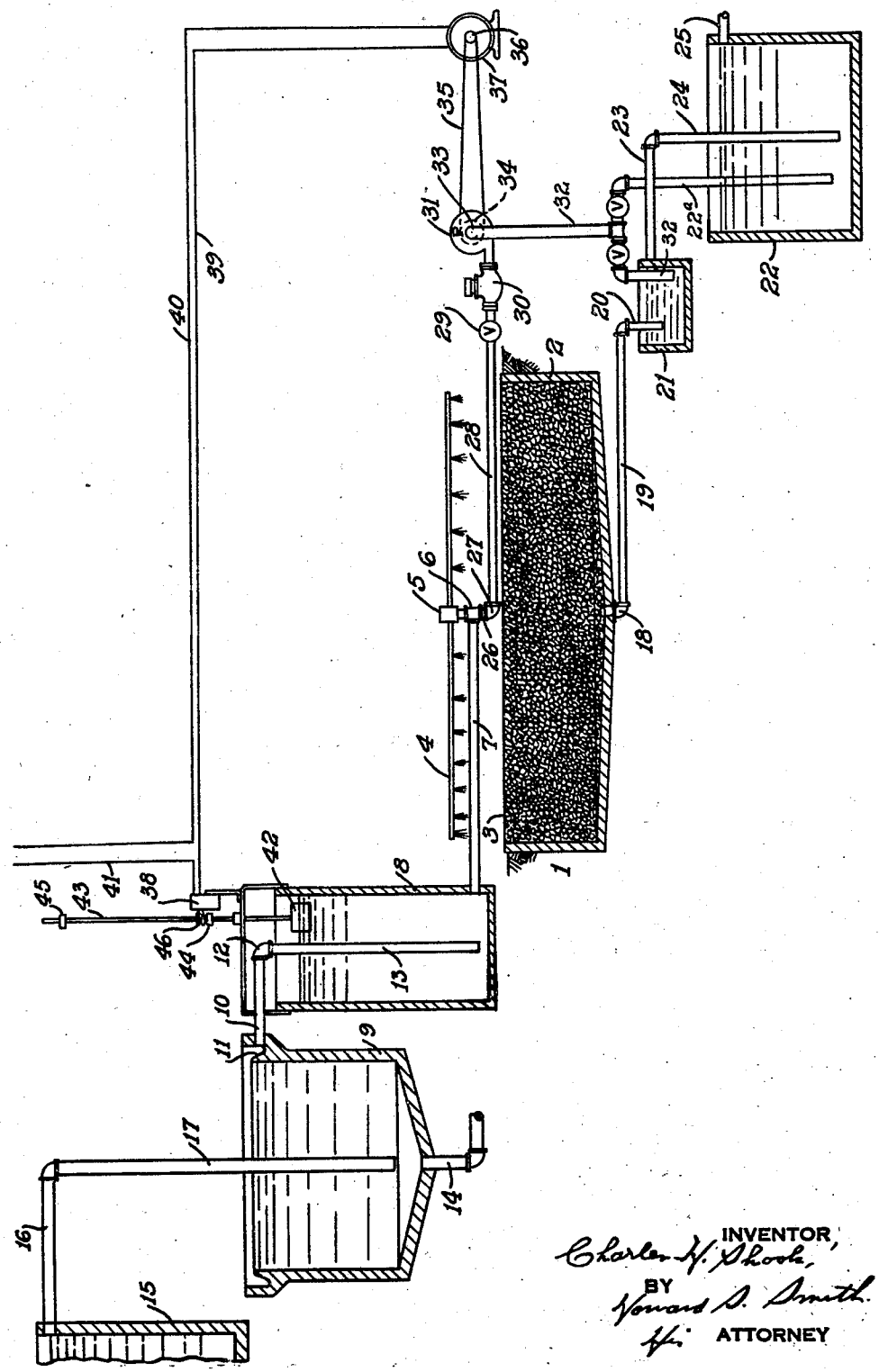

Patented Nov. 2, 1937

2,097,779

UNITED STATES PATENT OFFICE 2,097,779

REISSUED

MEANS FOR PURIFYING POLLUTED LIQUIDS

Charles H. Shook, Dayton, Ohio

FEB 2 2 19

Application April 29, 1935, Serial No. 18,925

4 Claims. (Cl. 210—5)

This invention relates to a new and useful process of, and means for, purifying polluted liquids.

Polluted liquids such as sewage are composed, among other things, of nitrogen bearing compounds which must be oxidized to insure good purification.

There are three common methods of biologically oxidizing the nitrogen compounds in polluted liquids: the oldest, and now practically abandoned, system of intermittent sand filtration; the trickling filter; and the activated sludge method. Sand filters are very large and filtration rates are slow. Trickling filters as ordinarily employed are smaller than sand filters and allow much higher rates of sewage application. The activated sludge system is temperamental in its behavior, and expensive in construction and operation.

While this invention relates to the recirculation of polluted liquids through a trickling filter to increase its efficiency, whether the filter be back of a chemical plant or any other type of plant, or be the sole unit of a system, it is particularly concerned with the recirculation of such liquids through a trickling filter that is back of a chemical plant.

It would seem to be a logical conclusion that if an impure liquid receives purification by passing once down through a depth of trickling filter, a second passage of that liquid through the filter would be bound to improve it to some degree.

While a given quantity of a polluted liquid passing twice through a continuously operating filter will not be contained therein twice as long as the same quantity of liquid passing only once through such a filter, the liquid in the first case will be in contact with the filter media somewhat longer than the liquid in the second case, resulting in more efficient purification.

The chief value, however, of recirculation lies in the inoculation or activation obtained. The biologic growths or cultures, which we see in the form of slime or jelly at different levels in the ordinary trickling filter, vary tremendously. If a liquid is discharged onto a customary trickling filter, the top layer acts to strain out the suspended material, the next layer to inoculate the liquid with oxidizing organisms, and the rest of the filter to carry out the oxidation process. If liquid which has once passed through the filter, and which contains oxidizing organisms, is put back in the top of the filter, it follows that much more of the filter can be utilized to carry out the oxidizing process. The biologic growth, or bacterial slime, which continually sloughs from the filter, may prove of exceptional value in activating the filter and should be returned separately or in conjunction with the liquid if desired.

Among other things, the removal of suspended and colloidal organic material prior to filtration, decreases the load upon the filter. By removing this material first, there is actually less work for the filter to do, and consequently it can be smaller per gallon of liquid treated. Also, if these organic solids are prevented from being deposited in the top layer of the filter, less danger from clogging and consequently better air circulation through the filter will result.

Organic material in solution is immediately available for oxidation by the filter, whereas solid material can digest on the outer surface only. It is well known that a cake of ice disintegrates much faster when broken into small pieces than if it were left in a large cake. So it is with solids on a filter. The smaller the particles, the more rapid the digestion. Consequently, if only the soluble solids are discharged to the filter, its efficiency should be increased.

To insure complete efficiency in a system under which the trickling filter is placed back of a chemical plant, the pH value of the discharge to the filter must be maintained nearly constant. It is found that bacteria are seriously affected by changes in pH and that the limits are relatively narrow. It is possible to accustom them to a pH value that is higher or lower than their normal point, but this must be done gradually. The fluctuations in pH that are found in normal sewage, therefore, are not conducive to the best filter action.

If chemical treatment, therefore, is applied to sewage ahead of trickling filter dosage, or any biologic treatment, the pH value of the discharge to the filter may be maintained nearly constant. Further, it can be maintained at a value that is particularly conducive to the purifying action of the organisms present. This value, it has been found, is within the alkaline range, where the nitrifying bacteria are more effective. The nitrifying organisms are the ones which oxidize the nitrogen bearing compounds of such polluted liquids as sewage, and, consequently, anything done to promote their activity, will be beneficial.

It is therefore one of the principal objects of this invention to first treat the liquid to be purified with chemicals, not only to settle out finely divided and colloidal material but to maintain that liquid at a relatively uniform pH after which the material remaining in the treated liquid is oxidized by biologic action. This oxidation may be effected by passing the treated liquid through a trickling filter, or through granular material, such as sand, or by aeration and activation.

As the human body can function more efficiently at certain uniform temperatures, so can the nitrifying bacteria be made more effective in oxidizing the nitrogen bearing compounds of polluted liquids, such as sewage, at a uniform pH. Therefore, it is a particular object of this invention to maintain the pH constant, within the alkaline range during the chemical treatment of the liquid ahead of the trickling filter dosage or other biologic action. This constancy, or uniformity of the pH value, is maintained within the alkaline range in my system by the addition of lime or marl to the liquid under treatment.

After the chemical treatment of the polluted liquid at a constant pH is completed, the liquid containing in solution such solids as sugar, that cannot be precipitated out, is conducted to a trickling filter.

It is therefore another important object of this invention to recirculate this treated liquid, or any other liquid that passes through the filter, to uniformly distribute the biologic growth or culture therein, as well as to inoculate and activate the incoming unfiltered liquid.

Through recirculation active oxidizing organisms are sent back to inoculate the incoming liquid. This inoculation starts purification. However, this preinoculation enables the top part of the filter to function more effectively than it would without such inoculation. By placing this bacterial slime, or jelly, more uniformly throughout the filter oxidation of the filtered liquid is aided, clogging is reduced, and increased loading of the filter permitted.

It is another object of the invention to return the clear liquid or bacterial slime, or both, or any part of either, to the incoming liquid. For the purpose of making this return, means may be provided for taking this liquid from the humus tank, or the bottom of the filter, or from a receptacle intermediate of both. It may also be desirable, however, to provide means for drawing this return liquid from the bottom of the filter with, when desired, a small amount of the solids deposited in the humus tank.

In large installations it would be more economical to connect the return line to the bottom of the filter, because then it would not be necessary to build such a large humus tank. At the same time, a small pipe could be connected between the bottom of the humus tank and the return line to draw from such tank solids as desired. If the return line were connected to the humus tank alone, the latter would have to be of large size, since otherwise some of the solids that ordinarily settle to the bottom of the tank would pass out into the stream into which the filtered liquids are ultimately discharged.

It is another important object of this invention to provide for the return of the filtered liquid to the dosage tank through the same pipe which discharges the liquid from this tank into the filter.

Other important and incidental objects will be brought out in the following specification and particularly set forth in the subjoined claims.

In the drawing the figure is a schematic view, partly in section, of one form of apparatus for practicing my filtration process.

Referring to the accompanying drawing for a detailed description of my process of filtering polluted liquids as practiced by the use of the apparatus therein disclosed, the numeral 1 designates a trickling filter which consists in this instance of a tank 2 containing filtering material that obviously may be of various substances but in this instance comprising broken rocks 3 that present suitable surfaces for the adherence of growing bacterial slime or jelly.

In the present instance the liquid to be filtered is distributed upon the top of the filter bed 3 by a rotatable spray head 4 carried by a short vertical riser 5. This riser is fitted in a T applied to one end of a horizontal inlet tube 7 which is connected to the lower end of a dosage tank 8, although it may lead directly from any receptacle containing a polluted liquid to be filtered.

The dosage tank 8 is in communication with a sedimentation tank 9 through a horizontal tube 10. This tube leads from a skimming gutter 11 in the upper portion of the tank 9 to the top of the dosage tank, where it is connected by a bend 12 to a tube 13 that projects downwardly to a point near the bottom of the tank to deliver thereto liquid that is skimmed from the tank 9. Sediment from the latter tank is drained off through the pipe 14.

The polluted liquid, after being chemically treated in a box 15 to settle out much of the solid matter it holds in suspension, flows from the top of that box through a horizontal pipe 16 and connected vertical tube 17 to the bottom of the sedimentation tank 9.

As will now be observed, I have illustrated in the drawing a trickling filter which is placed behind a chemical plant. To insure complete efficiency in such a system, the pH value of the discharge to the filter must be maintained at a constant pH value for the reasons heretofore given. This result is achieved in the present apparatus by the treatment of the liquid in the box 15 with such chemicals as ferric chloride, lime and marl.

Relieved of the solids which settle out of it in the box 15, the liquid passes from the top of that box to the bottom of the tank 9, where a further sedimentation takes place. In the remaining liquid, however, there is present in solution such soluble compounds as sugar which cannot be removed by chemical treatment and deposition. This solution rises to the skimming gutter 11 in the tank 9, from which it flows to the bottom of the dosage tank 8 for a controlled delivery through the tube 7 and rotating spray head 4 to the top of the trickling filter 1.

As heretofore stated, it is eminently desirable that there be a recirculation of the filtered liquid to distribute more uniformly throughout the tank 2 the biologic growth which is customarily found more prevalent in the lower part of the filter. The returned liquid not only carries this bacterial slime or culture to those portions of the filter where it is not present, but inoculates the incoming liquid with these active oxidizing organisms. Such inoculation starts purification.

The apparatus for recirculating the filtered liquid will now be described. Connected to the sloping bottom of the tank 2 by a bend 18 is one end of a horizontal tube 19, to the other end of which there is secured a short vertical pipe 20 which projects into a receptacle 21. Below this receptacle is a humus tank 22 into which the filtered liquid delivered to the tank 21 is adapted to flow from the latter through a horizontal pipe 23 and connected vertical tube 24. This tube discharges the filtered liquid and humus pretty well down in the tank 22, from which the skimmed liquid, free of deleterious solids, flows into a river or other stream through a top pipe 25.

The tube 7 which conducts the treated liquid from the dosage tank to the filter, also serves to in the present apparatus to return the filtered liquid to that tank for recirculation through the filter. In order that the tube 7 may perform this dual function, I provide the following means for periodically reversing the flow of liquid through it.

Connected to the lower end of the T 6, through a short tube 26 and bend 27, is a horizontal pipe 28 which communicates at its other end, through a check valve 29 and meter 30, with a centrifugal return pump 31. Through a vertical tube 32 projecting from this pump into the bottom portion of the receptacle 21, filtered liquid is drawn from the latter by the pump and forced through the valve 29, and pipes 28 and 7, into the dosage tank when the pump is operated by the following means.

Secured to the pump shaft 33 is a pulley 34 which receives a belt 35 that is driven by the armature shaft 36 of an electric motor 37. This motor is started and stopped by a conventional electric switch 38 from which a connecting wire 39 leads to the motor. Another wire 40 connected to the motor, and a wire 41 connected to the switch, include both in a circuit supplied with current by a source not shown.

When the liquid descends to the bottom of the dosage tank 8, it carries down with it a float 42 to which there is attached an upwardly projecting rod 43. This rod carries two fixed collars 44 and 45 between which a forked switch arm 46 straddles the rod. When the upper collar 45 is lowered into engagement with the switch arm 46 by the descending float, the switch 38 will close the electric circuit to the motor 37, which in turn will operate the pump 31 to return the filtered liquid from the receptacle 21 together with some of the solids from the humus tank 22, to the dosage tank 8, through the same pipe 7 that carried the liquid to the filter. These solids are drawn from the humus tank through a pipe 22ᵃ connected between the humus tank and the tube 32. During this return flow of the liquid, the spray head still continues to revolve, because a part of this liquid will be forced into the riser 5 for distribution upon the top of the filter bed. A part of the filtered liquid, however, is returned to the dosage tank 8 to inoculate the incoming unfiltered liquid.

When the float 42 is carried by the incoming liquid to a pre-determined level, the collar 44 will engage the switch arm 46 to open the switch 38 and thereby stop the motor. The filtered liquid, together with the fresh liquid which it has inoculated with the active oxidizing organisms it has carried into the dosage tank from the filter and the humus tank, will now flow back to the spray head through the pipe 7, for distribution upon the top of the filter bed 3. The recirculation of this filtered liquid through the filter more uniformly distributes therein, and more particularly deposits in its top portion, the bacterial slime or jelly which it has gathered from the bottom part of the filter in its previous descent therethrough. One part of the filter will therefore more nearly approach the efficiency of any other part in the process of oxidation.

This recirculation of the filtered liquid as many times as desired, is carried on in the present instance through the single pipe 7 by means of the electrically operated pump 31, whose operation is automatically controlled by the float actuated switch 38.

As stated before, the invention is not limited to a filter which in this instance is back of a chemical plant, since it may be placed back of any other type of plant, or may be the sole unit of a system. In any use that may be made of my trickling filter, the recirculation of the filtered liquid will actively aid the process of oxidation of the polluted liquids, and permit economies of construction and operation that are not possible with filters of the original types.

Having described my invention, I claim:

1. In an apparatus of the type described, a dosage tank to receive polluted liquids, a trickling filter, means to receive the filtered liquid, a single conduit for delivering liquid from said dosage tank to the trickling filter and piping for returning the filtered liquid from the filtered liquid receiving means to said conduit for passage therethrough to said dosage tank for recirculation through the filter.

2. In an apparatus of the type described, means for the chemical treatment and sedimentation of polluted liquids, a dosage tank, means for conducting the liquid from which materials have been removed by chemical treatment and sedimentation, to the dosage tank, a trickling filter, means to receive the filtered liquid, a single pipe for discharging said treated liquid from the dosage tank to the filter and piping for returning the filtered liquid from the filtered liquid receiving means to said single pipe for passage therethrough to the dosage tank.

3. In an apparatus of the type described, a receptacle to receive polluted liquids, a trickling filter, means for conducting said liquids to the filter, a humus tank, a tank intermediate the trickling filter and humus tank, a discharge line leading from the filter to the intermediate tank, a second line leading from the latter to the humus tank, a return line between the intermediate tank and the first receptacle, a pipe connected between the humus tank and the return line, and pump means for returning the filtered liquid in the intermediate tank, with some solids from the humus tank, to the receiving receptacle.

4. In an apparatus of the type described, a receptacle to receive polluted liquids, a trickling filter, a pipe for conducting said liquids from the receptacle to the top of said filter, means between the bottom of the filter and said pipe to return the filtered liquid to the receiving receptacle, a pump in said line to effect this return, an electric motor for operating the pump, a check valve in said line between the receiving receptacle and the pump, an electric switch, an electric circuit including said motor and switch, and a float in said receiving receptacle for actuating said switch, to close the circuit and start the pump when the liquid descends to a predetermined point in the receptacle, and to open the circuit and stop the pump when the liquid ascends to a predetermined point in the receptacle.

CHARLES H. SHOOK.